3,268,508
PROCESS FOR THE PREPARATION OF KANA-
MYCIN-N,N'-DIMETHANESULFONIC ACID
Shigehiko Sugazawa, Kyuji Abe, Sadao Onishi, Suginami-
ku, Tokyo-to, and Sumio Umezawa, Nerima-ku, Tokyo-
to, Japan, assignors to Sumio Umezawa, Tokyo, Japan,
and Tanabe Seiyaku Co., Ltd., Osaka, Japan, a corpo-
ration of Japan
No Drawing. Filed Sept. 7, 1960, Ser. No. 54,351
Claims priority, application Japan, Sept. 8, 1959,
34/28,741
11 Claims. (Cl. 260—210)

This invention relates to kanamycin-N,N'-dimethane-
sulfonic acid and to a process for preparing it.

Kanamycin is a water-soluble basic antibiotic produced as an elaboration product of *Streptomyces kanamyceticus* according to the procedure set forth by H. Umezawa et al. in the "Journal of Antibiotics," Series A, 10, 181–188 (1957). It has been shown by S. Umezawa et al., "Journal of Antibiotics," Series A, 11, 120–121 (1958), to have the following structure:

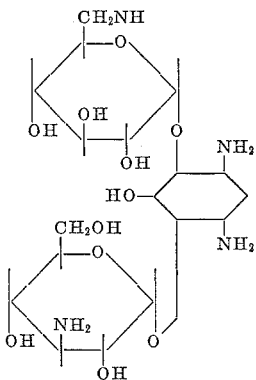

As shown above, kanamycin has four free amino groups in the molecule and may form an acid-addition salt with many kinds of acid. Kanamycin is ordinarily recovered from fermentation beer and commercialized as its mono-sulfate, but the monosulfate is somewhat inconvenient for preparation of intramuscularly-injectable solution due to its insufficient water-solubility. Also, the monosulfate has a toxicity which limits the usefulness thereof as a bacteriostat.

The present invention is intended and adapted to over-come the disadvantages inherent in kanamycin monoacid salt, and to provide a compound thereof which has a substantially higher degree of solubility and a substantial-ly lower degree of toxicity than said monoacid salt.

It is also among the objects of the present invention to produce a bacteriostatic substance which is effective against both Gram positive and Gram negative bacteria.

It is further among the objects of the invention to pro-duce a substance of the character described which does not contain in its molecule any physiologically unneces-sary metals or which may be harmful to the human system.

It is still further among the objects of the invention to provide a process for the production of said substance which is simple, in which the yield thereof is high, and as a result of which said substance is obtained in a highly pure state.

In accordance with the invention, it has now been found that kanamycin-N,N'-dimethanesulfonic acid is less toxic than kanamycin itself and its derivatives hitherto prepared, and more soluble in water than kanamycin monosulfate, giving a solution of the optimum pH value for intramuscular injection, and yet it possesses an equiv-alent activity against many of bacteria inhibited by kana-mycin. Kanamycin-N,N'-dimethanesulfonic acid has a methanesulfonyl moiety combined with two of the amino groups of the kanamycin molecule while the residual two amino groups are in the free form. Therefore, kana-mycin-N,N'-dimethanesulfonic acid is an inner salt and has no metallic ion.

Kanamycin-N,N'-dimethanesulfonic acid occurs as colorless and hygroscopic crystals in its pure form and it is easily soluble in water but insoluble in many organic solvents. A 10% aqueous solution thereof has a pH value of 6.8 to 7.1. When the potency of kanamycin-N,N'-dimethanesulfonic acid is measured according to the standard method for assay for kanamycin, the potency is assayed as 700 to 730 mcg./mg. Kanamycin-N,N'-di-methanesulfonic acid is much less acutely toxic than any other known acid salts or derivatives of kanamycin.

Doses of kanamycin-N,N'-dimethanesulfonic acid in the amount of 6000 mg./kg. at the tail vein of mice re-sults neither in death of the mice tested nor in any poison-ing symptoms.

The compound of the invention can be prepared by a metathetical reaction involving equimolecular amounts of dibasic acid-addition salt of kanamycin and a metal salt of hydroxymethanesulfonic acid in which the acid is ca-pable of forming a water-insoluble salt with the metal. The reaction is typically illustrated by the following equation:

wherein $KM(NH_2)_4$ represents the kanamycin free base.

The hydroxymethanesulfonates herein employed in-clude the salts of alkaline earth metals such as calcium, barium, strontium, etc. Any dibasic acid-addition salt of kanamycin can be used provided that the acid of said salt is capable of forming a salt with said metal having a solubility in water substantially lower than that of kana-mycin-N,N'-dimethanesulfonic acid.

It is ordinarily preferred to employ a salt of kanamycin with a dibasic acid such as sulfuric acid, oxalic acid, citric acid, tartaric acid and the like. It is not necessary, how-ever, to use pure crystals of said acid salt, a solution con-taining about equimolecular amounts of both kanamycin free base and said acid in water may also be employed. The reaction is conveniently carried out by adding a solu-tion of one of the reactants under stirring to a solution containing the other reactant, under which conditions the metal salt of the dibasic acid ordinarily precipitates, while kanamycin-N,N'-dimethanesulfonic acid is formed as a solution and can be recovered by conventional means. Crystalline kanamycin-N,N'-dimethanesulfonic acid is ordinarily recovered by filtration of the reaction mixture to remove any insoluble metallic salt, and by then adding an organic solvent such as methanol, ethanol and acetone to the filtrate and kanamycin-N,N'-dimethanesulfonic acid precipitates, and by filtering or centrifuging same.

The product can then be washed with a solvent such as methanol, dried at room temperature or above and fur-ther purified, if desired, by recrystallization to produce, in a substantially pure form, kanamycin-N,N'-dimethane-sulfonic acid.

Following are several specific examples of the opera-tion of the present invention to illustrate and not to limit it:

*Example 1*

2.8 g. of calcium hydroxymethanesulfonate was added to a mixture of 6.0 g. of kanamycin monosulfate in 25 cc. of water. The mixture was heated on a boiling water-bath for 2 hours. Precipitation of calcium sulfate began immediately; after cooling the precipitate was filtered off. The filtrate was poured into 200 cc. of methanol and colorless crystalline kanamycin-N,N'-dimethanesulfonic acid was collected by filtration, washed with methanol and dried; weight 6.7 g.; it decomposed at about 210 to 220° C.

*Analysis.*—Calculated for $C_{20}H_{40}N_4O_{17}S_2$: C, 35.71; H, 5.99; N, 8.33; S, 9.53. Found: C, 35.55; H, 6.34; N, 7.98; S, 9.28.

*Example 2*

A mixture of 6.0 g. of kanamycin monosulfate in 25 cc. of water was added to a solution of 3.95 g. of barium hydroxymethanesulfonate in 10 cc. of water and the resulting mixture was heated on a water-bath for 1 hour.

After cooling, the precipitated barium sulfate was filtered off. The filtrate was poured into 200 cc. of methanol and crystalline kanamycin-N,N'-dimethanesulfonic acid was collected by filtration, washed with methanol; weight 6.7 g.

*Example 3*

4.85 g. of kanamycin free base in 15 cc. of water was neutralized with 1.26 g. of oxalic acid. To the resulting solution, a solution of 2.8 g. of calcium hydroxymethanesulfonate was added and the mixture was heated on a boiling water-bath for 1 hour. When the reaction mixture was treated as described in Example 1, 6.7 g. of kanamycin-N,N'-dimethanesulfonic acid was obtained.

*Example 4*

A solution of barium hydroxymethanesulfonate was prepared by bubbling sulfur dioxide gas into a mixture of 3.3 g. of barium carbonate, 28 g. of 37% aqueous solution of formaldehyde and 8.5 cc. of water for 45 minutes on an iced water-bath. To this was added a solution of 8.7 g. of kanamycin monosulfate in 61 cc. of water. The mixture was heated on a boiling water-bath for 1 hour and then cooled. After removing barium sulfate by filtration, 250 cc. of methanol was added to the filtrate. Kanamycin-N,N'-dimethanesulfonic acid crystallized out and was collected by filtration. Yield: 9.5 g. (98%).

We claim:
1. A process for one-phase production of kanamycin-N,N'-dimethanesulfonic acid represented by the formula:

$$KM(NH_3)_2{}^{++}(NHCH_2SO_3)_2{}^{--}$$

wherein KM represents kanamycin moiety with removal of four amino groups from the molecule, said acid being a substantially neutral inner salt which comprises reacting kanamycin as a dibasic acid-addition salt taken from the class consisting of the mono-sulfate, the mono-oxalate, the monocitrate and the mono-tartrate with an alkaline earth metal salt of hydroxymethanesulfonic acid in aqueous solution whereby said inner salt is formed with splitting off of both said metal and said dibasic acid moieties of the reactants in the form of an insoluble salt thereof.

2. A process according to claim 1 characterized in that said metal is calcium.

3. A process according to claim 1 characterized in that said metal is barium.

4. A process according to claim 1 characterized in that said metal is strontium.

5. A process according to claim 1 characterized in that said kanamycin is in the form of its monosulfate.

6. A process according to claim 1 characterized in that said kanamycin is in the form of its monooxalate.

7. A process according to claim 1 characterized in that said kanamycin is in the form of its monocitrate.

8. A process according to claim 1 characterized in that said kanamycin is in the form of its monotartrate.

9. A process according to claim 1 characterized in that said mixture is heated to about the boiling point.

10. A process according to claim 1 characterized in that said product is recovered from the reaction mixture by filtration.

11. A process according to claim 1 characterized in that said product is separated from the reaction mixture and treated with an organic solvent in which it is insoluble, to precipitate said product.

References Cited by the Examiner

FOREIGN PATENTS 552,562   2/1958   Canada.

OTHER REFERENCES

Umezawa et al., "Jr. of Antibiotics, Ser. A, Japan," May 1959, pages 114–5.

Umezawa et al., "Jr. of Antibiotics, Ser. A, Japan," July 1959, vol. XIII, pages 117 and 124.

LEWIS GOTTS, *Primary Examiner.*

ABRAHAM H. WINKLESTEIN, *Examiner.*

A. L. MONACELL, J. R. GENTRY, *Assistant Examiners.*